No. 670,561. Patented Mar. 26, 1901.
E. B. HOEGEMANN.
SHOE LACING CLASP.
(Application filed Jan. 7, 1901.)
(No Model.)

Witnesses,

Inventor,
Edward B. Hoegemann

UNITED STATES PATENT OFFICE.

EDWARD B. HOEGEMANN, OF OAKLAND, CALIFORNIA.

SHOE-LACING CLASP.

SPECIFICATION forming part of Letters Patent No. 670,561, dated March 26, 1901.

Application filed January 7, 1901. Serial No. 42,320. (No model.)

*To all whom it may concern:*

Be it known that I, EDWARD B. HOEGEMANN, a citizen of the United States, residing at Oakland, county of Alameda, State of California, have invented an Improvement in Shoe-Lacing Clasps; and I hereby declare the following to be a full, clear, and exact description of the same.

My invention relates to improvements in devices whereby the shoe-lacings may be secured without the tedious tying of knots, &c., and which can be instantaneously released when desired.

It consists, essentially, of two spring-actuated circular jaws having concentric rows of teeth adapted to register, means by which the device may be secured to the shoe, and of details more fully to be set forth.

Figure 1:
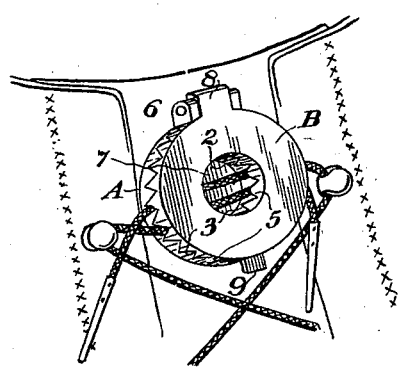
Figure 2:
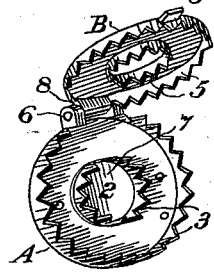
Figure 3:
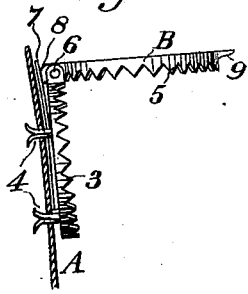
Figure 4:
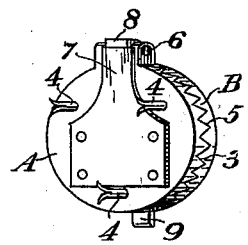

Referring to the accompanying drawings, Figure 1 is an enlarged view of the device, showing its application. Fig. 2 is a view showing the jaws opened. Fig. 3 is a side view showing the method of attachment to a shoe. Fig. 4 is a rear view of the device. All the foregoing-described figures are on an exaggerated scale.

A represents the lower jaw, consisting of a disk having a central opening 2, with the inner and outer edges of this disk flanged and provided with teeth, as 3. The bottom of this jaw is provided with suitable means, as the prongs 4, by which the device may be attached to the tongue or upper of the shoe. B is a similar disk jaw, having a central opening and provided with similar concentric rows of teeth 5, adapted to register with the teeth on the lower jaw. The jaws are pivoted, as at 6, and a spring 7 upon the bottom of the lower jaw bears stiffly upon a projection 8 upon the upper jaw, by which the two are held tightly together.

In order to open the jaws and disengage the strings, a projection 9 is formed upon the upper jaw. When the strings have been passed between the jaws, these latter are pressed down and the sharp teeth hold the strings from any possibility of becoming loosened, doing away with all tying of knots, dangling ends, and the vexations usually incident to shoe-lacing fastenings. By reason of the double row of concentric registering teeth the strings are held in fact by four sets of teeth, and there is absolutely no possibility of slipping or loosening.

Furthermore, this device is neat in appearance and very small in size, being in fact scarcely larger than a five-cent piece.

While I have shown my device as circular in shape, it is understood that the same principle is applicable in other forms, as oval, heart shape, &c.

Having thus described my invention, what I claim as new, and desire to secure by Letters Patent, is—

1. A shoe-lacing device consisting of two pivoted jaws each having an opening and a plurality of concentric rows of teeth with the teeth of one jaw adapted to register with those of the other jaw, a spring by which the jaws are normally held together and means by which the device may be secured to the shoe.

2. A shoe-lacing device, consisting of two pivoted members, each member formed of a disk having a circular opening, inner and outer concentric flanges, teeth upon these flanges adapted to register, a spring by which these members are normally held together, and means by which the device may be secured to the shoe.

3. The combination in a shoe-lacing device of two pivoted jaws each composed of a disk, having inner and outer concentric flanges, teeth upon these flanges, the teeth upon the upper jaw adapted to register with those on the lower, a spring upon the lower jaw acting upon the upper to hold the two in a normally-closed position, points upon the lower jaw by which the device may be secured to the shoe and a projection upon the upper jaw by which the device may be opened.

In witness whereof I have hereunto set my hand.

EDWARD B. HOEGEMANN.

Witnesses:
J. H. A. FOLKERS,
CHAS. E. TOWNSEND.